United States Patent Office 3,010,970
Patented Nov. 28, 1961

3,010,970
GRIT-FREE, SPIRIT SOLUBLE PHTHALOCYANINES FOR BALL POINT PEN INKS
Norman W. Fiess, Ringoes, N.J., assignor to American Cyanamid Company, New York, N.Y., a corporation of Maine
No Drawing. Filed July 29, 1959, Ser. No. 830,203
7 Claims. (Cl. 260—314.5)

This invention relates to an improved method for the preparation of guanidine salts of sulfonated phthalocyanines, which are free from sulfate contaminants, by using first a soluble calcium compound, and then a soluble barium compound to remove sulfate impurities, and the spirit-soluble phthalocyanine colors thus produced. These sulfate free phthalocyanine colors are particularly useful for ball point pen inks.

Ball point pen inks require colors which have a high intensity, are resistant to fading, are resistant to chemical agents in general, and preferably water insoluble. Such colors must be soluble in the ink vehicle and are desirably free from gritty materials which will cause grinding to occur thus interfering with the mechanical relationship between the ball and the socket at the writing tip.

Some of the most stable of the colors, very intense colors, and solvent soluble colors for ball point pen inks are the guanidine salts of the sulfonated phthalocyanines. Such spirit-soluble blue dyes are described in United States Patent No. 2,153,740, Carleton and Woodward, April 11, 1939, "Spirit Soluble Blue Dyes." Usually such blue colors of the phthalocyanines are found to have a certain amount of spirit insoluble guanidine salts present which causes an undesirably high rate of abrasive wear in the ball socket.

It has now been found that most of the gritty material in the guanidine salt of the sulfonated phthalocyanine is the result of guanidine sulfate impurities and that the colors may be prepared free from such insoluble impurities if sulfate ions are removed from the phthalocyanine sulfonic acid prior to its reaction with the guanidine.

The phthalocyanine sulfonic acid is usually produced by carrying out a sulfonation in 10 to 20% oleum at temperatures of about 95 to 97° C. until about 2.0 to 3.5 sulfonic groups per molecule of phthalocyanine have been introduced. Preferably about 2.8 to 3.2 groups are introduced.

A lower strength acid may be used under more rigorous sulfonating conditions. A stronger acid may be used at a lower temperature and for a shorter time. Weaker than 98% sulfuric acid or stronger than 30% oleum is not commercially convenient. Chlorosulfonic acid may also be used as at least part of the sulfonating agent. For batch processes a time of ½ to 12 hours is commercially convenient. Temperatures below 90° C. may cause difficulty in subsequent filtration. Considerably higher temperatures may be used, but temperatures above about 150° C. may cause greater decomposition of the phthalocyanine.

A considerable excess of the acid is used. For convenience in handling, at least four pounds of acid are used per pound of phthalocyanine. The size of the container is the only limit on dilution.

The concentrated phthalocyanine sulfonate is separated from the bulk of the residual sulfuric acid. Conventional separation procedures such as filtration, decantation, centrifugation, etc. may be used. The cake is slurried with water, then the residual acid is neutralized. An alkali hydroxide such as sodium hydroxide is economical for this step. Other hydroxides including potassium hydroxide or lithium hydroxide may be used. The entire sulfonation mixture may be neutralized but it is usually more advantageous to separate out as much as possible of the acid to reduce consumption of the alkali hydroxide. The neutralized phthalocyanine sulfonate salt is water soluble.

A soluble calcium compound such as calcium chloride is added in a stoichiometric quantity sufficient to precipitate inorganic sulfates. The amount required depends upon the efficacy of the preliminary acid separation and the quantity of sulfate ions present. An excess of calcium ions precipitates the phthalocyanine sulfonate as a lake, which reduces the yield of the desired product. The residual sulfate ions are to a large extent precipitated as the calcium salt, which salt is removed from the mixture by filtration, centrifugation or other separating procedure. There is necessarily some residual sulfate left because soluble calcium compounds such as calcium chloride do not cause complete precipitation of all sulfate ions. Even though the solubility of calcium sulfate is comparatively low in water, there is sufficient effect from other materials present to change the activity coefficient and cause larger amounts of the sulfate to remain in the solution than would be otherwise expected.

To the phthalocyanine sulfonate is then added a sufficient amount of a soluble barium salt such as barium chloride to precipitate the remaining sulfate ions as barium sulfate. The barium sulfate is removed by filtration, centrifugation, decantation, etc. leaving phthalocyanine sulfonate which is free from sulfate ions. The phthalocyanine is then precipitated as an amine salt which is filtered out from the solution and washed. This residual amine salt of the sulfonated phthalocyanine is comparatively water insoluble but is soluble in ball point ink vehicles such as butylene glycols, propylene glycols, etc. The solubility in the monoethyl ether of diethylene glycol (Carbitol) is indicative of the spirit-solubility of the material and may be used for test purposes even though other solvents may be used as the vehicle.

The final product has less than 0.1% of the weight of the product of spirit-insoluble materials present.

Even though impurities other than the amine sulfates may be present, a reliable test is to dissolve a 5 gram sample of the product in 100 milliliters of hot methanol, then filtering through a Gooch crucible, washing the filter mat with additional hot methanol until free of color and then determining the weight of the insolubles. Total insolubles by this method are less than 0.1% of the weight of the product.

A conventional precipitation using a soluble calcium salt only to remove excess sulfates gives in the order of 0.3% of insoluble materials present.

The use of a barium salt as the sole precipitant of the insoluble sulfates is not desirable because the cost of the barium salt is comparatively high and a massive barium sulfate precipitate is difficult to filter. In this instance under comparative conditions, a straight barium sulfate precipitate required 10 hours for filtration as compared with 5 minutes for filtration of each of the calcium and barium precipitates when the initial precipitate was calcium sulfate.

The guanidine salts of copper phthalocyanine are particularly acceptable commercially because of color, stability, price, etc. for ball point pen inks, etc. Other phthalocyanines may be used in the present invention including such phthalocyanines as metal free phthalocyanine, nickel phthalocyanine, cobalt phthalocyanine, monochlor copper phthalocyanine, and mixtures thereof. Inert substituents may be present on the phthalocyanine rings but there must be sufficient open positions for sulfonation to occur. The degree of sulfonation affects the water solubility of the resultant sulfonated phthalocyanine. From 2 to 3.5 sulfonic groups per phthalocyanine molecule gives a soluble product which is comparatively easy to handle and meets requirements. Sulfonation to 2.8 to 3.2 gives particularly useful results with copper phthalocyanine. All of the phthalocyanine molecules are not necessarily equally sulfonated, but their average is used to describe the material for present purposes.

The guanidine used to solubilize the sulfonated phthalocyanine in the spirit vehicles is preferably a disubstituted guanidine, with a six membered ring on each amine group, which rings may be additionally substituted with methyl or methoxy groups, not necessarily the same; di-ortho-tolyl guanidine, di-ortho-anisyl guanidine, diphenyl guanidine, mixed di-xylyl guanidines, dicyclohexyl guanidine, phenyl xylyl guanidine, phenyl tolyl guanidine, and tolyl anisyl guanidine are illustrative of suitable guanidines.

These guanidine salts of the phthalocyanines are insoluble in water and permit the easy recovery of the colored material. The guanidine salts of the phthalocyanines are normally very soluble in the vehicles used for ball point pen inks thus permitting smooth, even writing.

The scope of the present invention is shown by the attached claims. Illustrative of certain advantages of the invention are the following examples:

Example 1

800 parts of copper phthalocyanine are sulfonated by heating in 4,000 parts 20% oleum at 95 to 97° for 2½ hours, the mixture being stirred during this period. The mixture is allowed to settle and is removed by decantation. The residue is slurried in 5,000 parts of water. Enough 24% sodium hydroxide, approximately 2,080 parts, is added to dissolve the copper phthalocyanine sulfonate and to bring the pH to between 6.8 and 7.2. Approximately a trisulfonation occurs. Depending upon the amount of sulfuric acid remaining after the decantation step, the required quantity of sodium hydroxide may vary over wide limits.

The mixture is heated to 65° C. and enough calcium chloride is added to precipitate the inorganic sulfates present. Inasmuch as the quantity may vary depending upon the amount of the acid poured off at decantation, it is necessary that an analysis be run and the amount of calcium chloride required be calculated. In a typical run 770 parts of calcium chloride di-hydrate ($CaCl_2 \cdot 2H_2O$) is added and the precipitated calcium sulfate is filtered from the solution. The calcium chloride is preferably in solution.

The residual sulfate is again determined by analysis. In a typical run 250 parts of barium chloride di-hydrate ($BaCl_2 \cdot 2H_2O$) were required. The barium chloride is dissolved in 600 parts water at 65° C. Then this solution is added to the calcium treated filtrate. 200 parts of diatomaceous earth filteraid are also added, the solution digested for 5 hours between 65 and 70° C. and the barium sulfate is separated by filtration.

The solution may be concentrated by evaporation to yield pure sulfonated copper phthalocyanine free from sulfate impurities.

Example 2

The sulfonated copper phthalocyanine free from sulfate impurities and prepared as in Example 1, but before removal of the water is added to a solution of 1,246 parts of di-ortho-tolyl guanidine dissolved in 13,480 parts of water and 625 parts 20° Bé. hydrochloric acid (or 197 parts real hydrochloric acid). The mixture is digested for one hour between 35 and 45° C. The di-ortho-tolyl guanidine salt of sulfonated copper phthalocyanine precipitates. The product is filtered from the solution, washed with water, dried, and ground. 1,770 parts are obtained. The residual blue product is an excellent coloring material for ball point pen inks, and contains less than 0.1% insolubles.

A 5 gram sample of the dry color is dissolved in 100 milliliters of hot methanol, the solution filtered through a tared Gooch crucible, the fiber mat is washed with hot methanol, the crucible is dried to constant weight, and the gain in weight determined. The insolubles consist of not only the di-ortho-tolyl guanidine sulfate but other impurities as well. In a group of typical runs the insoluble matter was found to run 0.08; 0.03; 0.01; 0.12; and 0.07% by weight of the color.

Example 3

Experiments following Examples 1 and 2 are conducted except that the step of adding barium chloride to remove the sulfates is omitted. About 0.3% of guanidine sulfate by weight of the dye is present in the final product.

Example 4

The procedure of Examples 1 and 2 are followed using metal free phthalocyanine and diphenyl guanidine, the other components remaining the same. A blue coloring matter is obtained which is spirit-soluble and makes an excellent color for a ball point pen ink. The product has less than 0.1% spirit-insolubles.

Example 5

Nickel phthalocyanine and di-ortho-xylyl guanidine are used as starting materials in repeating the procedures in Examples 1 and 2.

The product obtained is a good blue ball point pen ink color, and has less than 0.1% spirit-insolubles.

Example 6

Cobalt phthalocyanine and dicyclohexyl guanidine are used as starting materials, following the procedure of Examples 1 and 2. The product is an excellent color for ball point pen inks, and is a deep blue. The product has less than 0.1% spirit-insolubles.

Example 7

Monochlor copper phthalocyanine and phenyl xylyl guanidine are used as starting materials, following the procedure of Examples 1 and 2.

The product obtained is a good color for ball point pen inks, slightly greener than the product of Example 2; and has less than 0.1% spirit-insolubles.

Example 8

A 50—50 mixture of unmetallized- and copper-phthalocyanine is used as a starting material. The spirit-soluble material is obtained by adding di-ortho-anisylguanidine as the guanidine. A very satisfactory blue coloring material for ball point pen inks is obtained. The sulfate impurities are well under 0.1% by weight of the pigment.

In the above examples and in the following claims the parts are by weight unless otherwise specified.

I claim:
1. In the process of producing a spirit soluble color consisting essentially of a guanidine salt of a sulfonated phthalocyanine by sulfonating a phthalocyanine having sufficient unsubstituted ring positions to permit such sulfonation, until 2 to 3.5 sulfonic acid groups are attached to each phthalocyanine molecule, separating off the excess acid, and neutralizing to form an aqueous solution of the phthalocyanine sulfonate, the combination therewith consisting of: adding to the aqueous solution about the stoichiometric quantity of soluble calcium ions needed to react with the sulfate ions present, separating the precipitated calcium sulfate, adding about the stoichiometric quantity of soluble barium ions needed to react with the sulfate ions remaining, and separating the precipitated barium sulfate, adding a guanidine, and separating the spirit soluble, guanidine salt of the sulfonated phthalocyanine.

2. The process of producing a sulfate-free color of the phthalocyanine series, which comprises sulfonating a phthalocyanine selected from the group consisting of copper phthalocyanine, metal-free phthalocyanine, nickel phthalocyanine, cobalt phthalocyanine, monochlor copper phthalocyanine, and mixtures thereof, until an average of 2 to 3.5 sulfonic acid groups are attached to each phthalocyanine molecule, separating off excess acid and neutralizing with an alkali hydroxide, adding about a stoichiometric quantity of a soluble calcium compound needed to react with the free sulfate ions, filtering off the precipitated calcium sulfate, adding a soluble barium compound, and filtering off the precipitated barium sulfate, thus obtaining a sulfonated phthalocyanine of said group free from sulfates.

3. The process of producing a sulfate-free color of the phthalocyanine series, which comprises sulfonating copper phthalocyanine until an average of 2.8 to 3.2 sulfonic acid groups are attached to each copper phthalocyanine molecule, separating off excess acid, neutralizing with sodium hydroxide, adding about a stoichiometric quantity of calcium chloride needed to react with the free sulfate ions, filtering off the precipitated calcium sulfate, adding barium chloride in sufficient quantity to react with residual sulfate ions, and filtering off the precipitated barium sulfate, thus obtaining sulfonated copper phthalocyanine free from sulfates.

4. The process of producing a spirit-soluble, water-insoluble sulfate-free color of the phthalocyanine series, which comprises sulfonating a phthalocyanine until an average of 2 to 3.5 sulfonic acid groups are attached to each phthalocyanine molecule, separating off excess acid and neutralizing with an alkali hydroxide, adding about a stoichiometric quantity of a soluble calcium compound needed to react with the free sulfate ions, separating the precipitated calcium sulfate, adding a soluble barium compound, separating the precipitated barium sulfate, adding a guanidine and separating the spirit-soluble guanidine salt of the sulfonated phthalocyanine.

5. The process of producing a spirit-soluble, water-insoluble sulfate-free color of the phthalocyanine series, which comprises sulfonating copper phthalocyanine until an average of 2 to 3.5 sulfonic acid groups are attached to each copper phthalocyanine molecule, separating off excess acid, neutralizing with sodium hydroxide, adding about a stoichiometric quantity of calcium chloride needed to react with the free sulfate ions, filtering off the precipitated calcium sulfate, adding barium chloride in sufficient quantity to react with residual sulfate ions, filtering off the precipitated barium sulfate, adding a guanidine selected from the group consisting of di-ortho-tolyl guanidine, di-ortho-anisyl guanidine, diphenyl guanidine, dixylyl guanidine, dicyclohexyl guanidine, phenyl xylyl guanidine, phenyl tolyl guanidine, and tolyl anisyl guanidine and separating the spirit-soluble guanidine salt of the sulfonated copper phthalocyanine.

6. The process of producing a spirit-soluble water-insoluble sulfate-free color of the phthalocyanine series, which comprises sulfonating copper phthalocyanine until an average of 2.8 to 3.2 sulfonic acid groups are attached to each copper phthalocyanine molecule, separating off excess acid, neutralizing with sodium hydroxide, adding about a stoichiometric quantity of calcium chloride needed to react with the free sulfate ions, filtering off the precipitated calcium sulfate, adding barium chloride, filtering off the precipitated barium sulfate, adding di-ortho-tolyl guanidine, and separating the spirit soluble di-ortho-tolyl guanidine salt of sulfonated copper phthalocyanine.

7. The process of producing a spirit-soluble water-insoluble sulfate-free color of the phthalocyanine series, which comprises sulfonating a phthalocyanine selected from the group consisting of copper phthalocyanine, metal-free phthalocyanine, nickel phthalocyanine, cobalt phthalocyanine, monochlor copper phthalocyanine, and mixtures thereof, until an average of 2 to 3.5 sulfonic acid groups are attached to each phthalocyanine molecule, separating off excess acid and neutralizing with an alkali hydroxide, adding about a stoichiometric quantity of a soluble calcium halide needed to react with the free sulfate ions, filtering off the precipitated calcium sulfate, adding a soluble barium halide, filtering off the precipitated barium sulfate, adding a guanidine selected from the group consisting of di-ortho-tolyl guanidine, di-ortho-anisyl guanidine, diphenyl guanidine, dixylyl guanidine, dicyclohexyl guanidine, phenyl xylyl guanidine, phenyl tolyl guanidine, and tolyl anisyl guanidine and separating the spirit soluble guanidine salt of the sulfonated phthalocyanine.

References Cited in the file of this patent

UNITED STATES PATENTS

| | | |
|---|---|---|
| 2,153,740 | Carleton et al. | Apr. 11, 1939 |
| 2,600,377 | Chechak et al. | June 17, 1952 |

OTHER REFERENCES

Mellor: "Comprehensive Treatise of Inorganic Chemistry," vol. 10, Longmans, Green and Co., N.Y. (1930), pages 440–441.